US012595813B2

(12) United States Patent
Kato et al.

(10) Patent No.: US 12,595,813 B2
(45) Date of Patent: Apr. 7, 2026

(54) ATTACHMENT STRUCTURE FOR SHEET MATERIAL

(71) Applicant: YAZAKI CORPORATION, Tokyo (JP)

(72) Inventors: Hiroyuki Kato, Kakegawa (JP); Ryota Kataoka, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 284 days.

(21) Appl. No.: 18/488,015

(22) Filed: Oct. 16, 2023

(65) Prior Publication Data

US 2024/0047834 A1     Feb. 8, 2024

Related U.S. Application Data

(63) Continuation of application No. PCT/JP2022/044628, filed on Dec. 2, 2022.

(30) Foreign Application Priority Data

Dec. 3, 2021     (JP) ................................. 2021-197119

(51) Int. Cl.
*F16B 5/06* (2006.01)
*F16B 21/09* (2006.01)
*H01M 50/147* (2021.01)

(52) U.S. Cl.
CPC ............ *F16B 5/0664* (2013.01); *F16B 21/09* (2013.01); *H01M 50/147* (2021.01)

(58) Field of Classification Search
CPC ........ F16B 21/08; F16B 21/086; F16B 21/09; Y10T 24/42; H01M 50/147;

(Continued)

(56) References Cited

U.S. PATENT DOCUMENTS 3,700,206 A * 10/1972 Jones ...................... F16K 1/482
251/297
4,715,095 A * 12/1987 Takahashi ............... F16B 5/065
24/297

(Continued)

FOREIGN PATENT DOCUMENTS

JP        H03-113108 A      5/1991
JP        2016-143584 A     8/2016
JP        2020064776 A  *  4/2020  ............. Y02E 60/10

OTHER PUBLICATIONS

International Search Report and Written Opinion of the International Search Report for PCT/JP2022/044628 dated Jan. 31, 2023.

*Primary Examiner* — Amber R Anderson
*Assistant Examiner* — Kevin J Baynes
(74) *Attorney, Agent, or Firm* — KENEALY VAIDYA LLP

(57)        ABSTRACT

An attachment structure for a sheet material includes an attachment hole portion that is provided in a sheet material and in which a large-diameter hole and a small-diameter hole communicate with each other through a communication portion, a locking portion provided in a member to be attached corresponding to the attachment hole portion, and configured to lock the attachment hole portion to attach the sheet material to the member to be attached, and a projecting piece that is provided in the communication portion and in which a width of the communication portion is narrower than an inner diameter of the small-diameter hole. The locking portion includes an insertion guide portion having an inclined face formed on a side face of a column portion, and configured to bend the projecting piece in contact with the column portion in a thickness direction of the sheet material.

5 Claims, 9 Drawing Sheets

(58) Field of Classification Search
CPC ............. H01M 50/166; H01M 50/271; H01M 50/507; H01M 50/591
See application file for complete search history.

(56) References Cited

U.S. PATENT DOCUMENTS

| | | | | | |
|---|---|---|---|---|---|
| 4,787,602 | A | * | 11/1988 | Pidgeon | E01F 13/02 403/348 |
| 4,987,656 | A | * | 1/1991 | Sato | F16B 21/086 24/453 |
| 5,507,610 | A | * | 4/1996 | Benedetti | F16B 5/0628 411/908 |
| 5,669,118 | A | * | 9/1997 | Frano | A44B 11/04 24/666 |
| 6,196,758 | B1 | * | 3/2001 | Scarborough | F16B 21/09 403/379.2 |
| 6,457,217 | B2 | * | 10/2002 | Yoshii | F16B 19/1081 24/453 |
| 6,594,870 | B1 | * | 7/2003 | Lambrecht | F16B 5/0628 24/453 |
| 7,540,536 | B2 | * | 6/2009 | Hall | B60R 22/24 280/801.1 |
| 8,333,353 | B1 | * | 12/2012 | Silverman | F16M 13/00 248/205.6 |
| 9,630,573 | B2 | * | 4/2017 | Iwahara | B60R 13/0206 |
| 9,657,807 | B2 | * | 5/2017 | Morris | F16B 21/084 |
| 2015/0232131 | A1 | * | 8/2015 | Morris | F16B 5/0664 403/14 |

* cited by examiner

ATTACHMENT STRUCTURE FOR SHEET MATERIAL

CROSS-REFERENCE TO RELATED APPLICATIONS

The present application is a continuation application of PCT/JP2022/044628 that claims priority to Japanese Patent Application No. 2021-197119 filed on Dec. 3, 2021, the entire content of which is incorporated herein by reference.

TECHNICAL FIELD

The present disclosure relates to an attachment structure for a sheet material.

BACKGROUND ART

As an attachment structure for a sheet material for attaching a sheet material to a member to be attached, a structure is known in which a through hole is formed in the sheet material, and the sheet material is fixed to the member to be attached by thermal caulking by heating and melting a thermal caulking projection formed on the member to be attached in a state of penetrating the through hole.

Further, a method for thermally welding a sheet material to a member to be attached or bonding the sheet material to the member to be attached by using an adhesive, and a method for attaching the sheet material by sandwiching the sheet material between the member to be attached and another member are also known.

Further, an attachment structure using a holding clip is also known (see JPH03-113108A). The holding clip has a head portion for pinching and holding a decorative plate (sheet material) and a trunk portion for being inserted and fitted into an attachment hole of a panel plate (member to be attached), and is configured to fix the decorative plate to the panel plate. Further, the decorative plate is provided with a potbelly hole (keyhole) including a larger hole (large-diameter hole), a smaller hole (small-diameter hole), and a communication portion through which the larger hole and the smaller hole communicate with each other.

Then, a neck of the holding clip is fitted into the smaller hole by inserting the head portion of the holding clip into the larger hole among potbelly holes bored in the decorative plate and moving a neck of the trunk portion to the smaller hole through the communication portion in this state. Since the communication portion has a width smaller than a diameter of the neck of the holding clip, it is possible to prevent the neck of the holding clip from passing through the communication portion inadvertently, moving to the larger hole, and falling off.

Further, in a power supply device mounted on various vehicles such as an electric automobile that travels using an electric motor and a hybrid automobile that travels using both an engine and an electric motor, a busbar module is assembled to an upper portion of a battery assembly (assembled battery) including a plurality of unit cells (cells). The busbar module includes a plurality of busbars electrically connected to electrodes of the plurality of unit cells. The busbars are accommodated and held in a busbar case (busbar accommodating portion) of a resin case attached to the upper portion of the battery assembly (see JP2016-143584A).

In such a busbar module, an attachment structure is used in which a protruding portion of the resin case is inserted into a through hole provided in the busbar case, and the busbar case is locked to the resin case. The protruding portion provided on the resin case includes a columnar shaft portion and a flange portion formed integrally with a tip end of the shaft portion. The through hole provided in the busbar case has a shape that allows insertion of the flange portion of the protruding portion, and the busbar case has a shape of being movable in up-down and left-right directions around the shaft portion of the protruding portion. Since a side edge portion of a protective cover attached to the resin case is located above the busbar case, the busbar case can be prevented from falling off the resin case.

However, as in the above-described attachment structure for a sheet material, since the method for fixing the sheet material to the member to be attached by heat caulking, heat welding, or bonding using the adhesive requires equipment, and increases the number of attaching steps, the manufacturing cost is increased. Further, sheet requirements such as the thickness and material of the sheet material are also restricted. Further, the method for sandwiching the sheet material between the member to be attached and the other member or attaching the sheet material by the decorative plate holding clip has a problem of causing an increase in component cost and an increase in weight due to the forming of two components.

Further, in order to prevent the sheet material from falling off, when a width of the communication portion of the potbelly hole is set to be smaller than the diameter of the neck of the holding clip, it is necessary to make the neck of the holding clip pass through the communication portion while elastically deforming the communication portion so as to widen the communication portion at the time of attachment, and attachment workability is not good. For example, if passage of the neck of the holding clip through the communication portion of the potbelly hole is forced, the communication portion may be plastically deformed or broken.

The present disclosure has been made in view of the above circumstances, and an object thereof is to provide an attachment structure for a sheet material capable of reliably and easily attaching and detaching a sheet material to and from a member to be attached.

SUMMARY OF INVENTION

In order to achieve the above-described object, an attachment structure for a sheet material according to the present disclosure has the following features.

An attachment structure for a sheet material includes:

an attachment hole portion that is provided in a sheet material and in which a large-diameter hole and a small-diameter hole communicate with each other through a communication portion;

a locking portion provided in a member to be attached corresponding to the attachment hole portion, and configured to lock the attachment hole portion to attach the sheet material to the member to be attached; and a projecting piece that is provided in the communication portion and in which a width of the communication portion is narrower than an inner diameter of the small-diameter hole, in which the locking portion includes:

a column portion provided in the locking portion and inserted into the small-diameter hole;

a head portion formed at a tip end portion of the column portion, inserted into the large-diameter hole, and locked to an opening edge of the small-diameter hole; and an insertion guide portion having an inclined face formed on a side face of the column portion, and configured to bend the projecting piece in contact with the column portion in a thickness direction of the sheet material when the column portion is passed through the communication portion.

According to the attachment structure for a sheet material of the present disclosure, it is possible to reliably and easily attach and detach the sheet material to and from the member to be attached.

The present disclosure has been briefly described above. Further, details of the present disclosure can be clarified by reading modes for carrying out the disclosure (hereinafter, referred to as "embodiments") described below with reference to the accompanying drawings.

DESCRIPTION OF EMBODIMENTS

A specific embodiment of the present disclosure will be described below with reference to the drawings.

Figure 1:
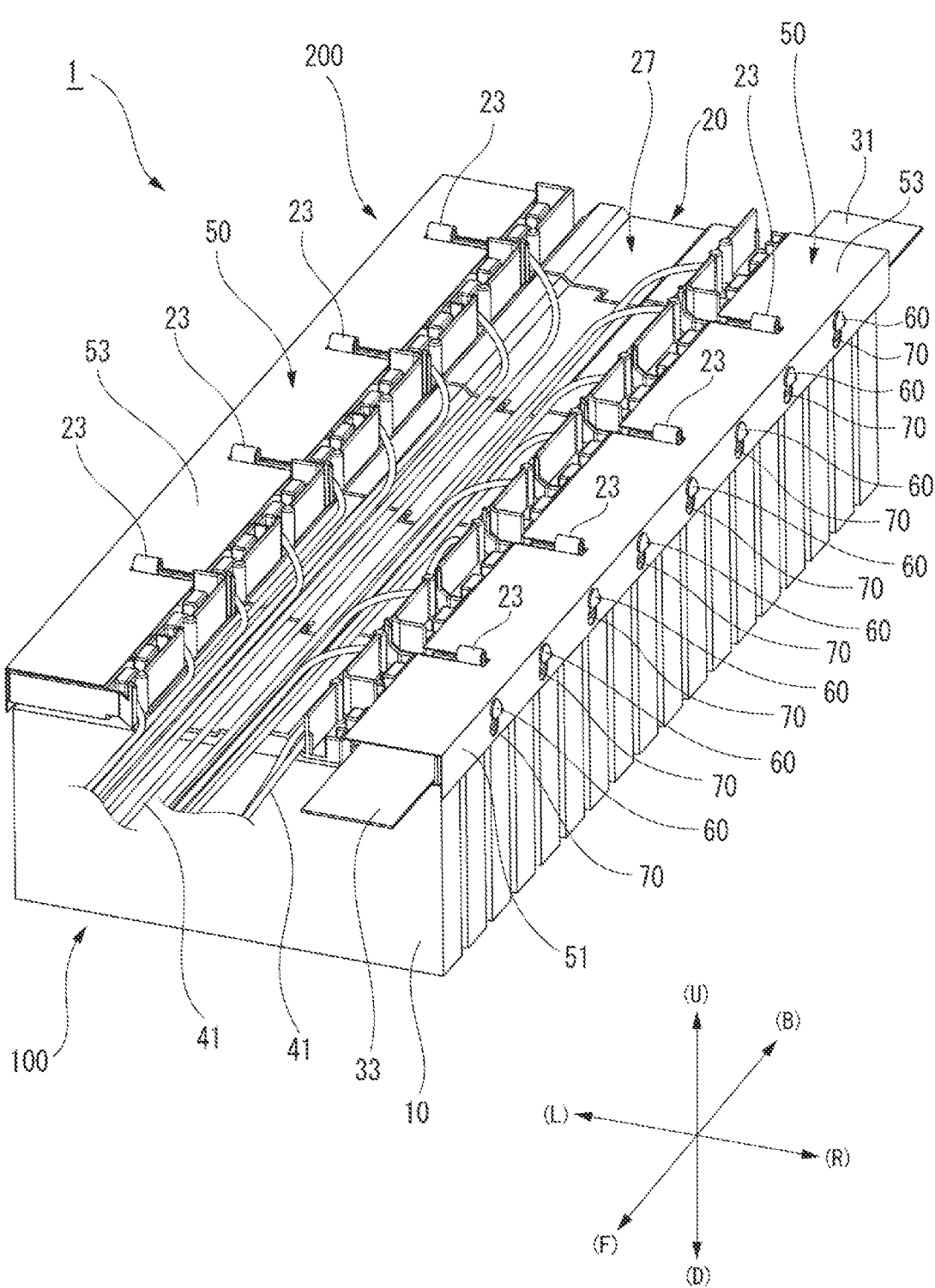
FIG. 1 is an overall perspective view showing a state in which a busbar module using a fixing structure for a sheet material according to an embodiment of the present disclosure is attached to an assembled battery.

FIG. 1 is an overall perspective view showing a state in which a busbar module 200 using a fixing structure for a sheet material according to an embodiment of the present disclosure is attached to an assembled battery 100, and FIG.

2 is an exploded perspective view of the busbar module 200 shown in FIG. 1. In the present specification, a front-rear direction (arrow (F)-(B) direction), an up-down direction (arrow (U)-(D) direction), and a left-right direction (arrow (L)-(R) direction) follow directions of the arrows shown in FIG. 1.

As shown in FIG. 1, the busbar module 200 according to the present embodiment is applied to an assembled battery 100 in which a plurality of (eighteen in this example) cells (unit cells) 10 are arranged side by side in the front-rear direction (arrow (F)-(B) direction). The busbar module 200 and the assembled battery 100 constitute a battery module 1. Further, a battery pack is formed by combining the plurality of battery modules 1.

In the present embodiment, each of the cells 10 constituting the assembled battery 100 is a square cell which is formed in a rectangular parallelepiped shape and in which a positive electrode 11 and a negative electrode 13 are provided at both ends in a longitudinal direction of an upper end face thereof which is a rectangular flat face. (See FIG. 2). The cells 10 are arranged in a way that the positive electrodes 11 and the negative electrodes 13 are alternately stacked in opposite directions so as to be adjacent to each other.

The cells 10 constituting the assembled battery 100 are not limited to square cells, and various unit cells such as laminated cells and cylindrical cells can be used.

Figure 2:
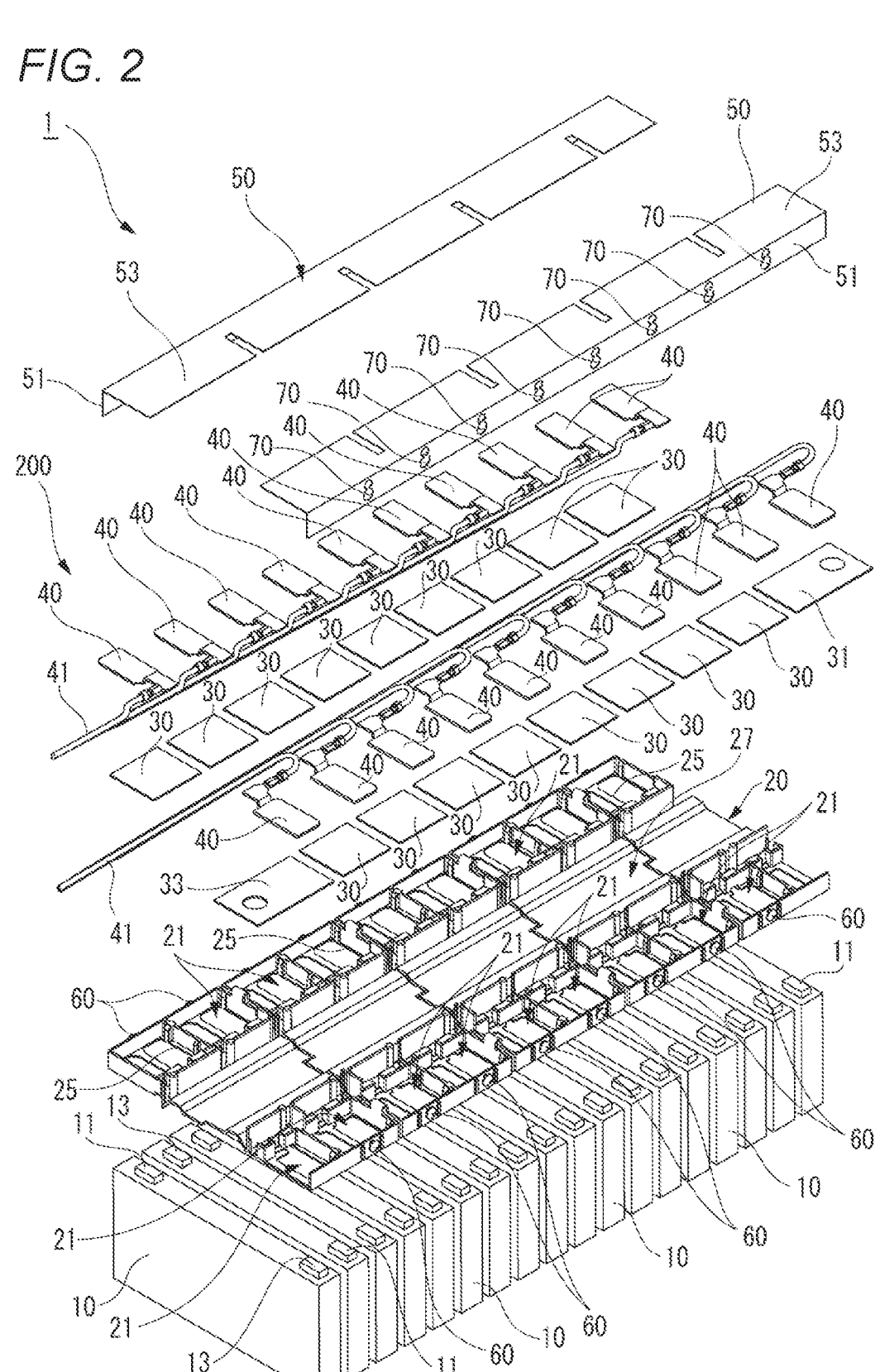
FIG. 2 is an exploded perspective view of the busbar module shown in FIG. 1.

As shown in FIG. 2, the busbar module 200 includes a resin case (member to be attached) 20 made of an insulating resin and having a plurality of busbar accommodating portions 21, busbars 30 made of conductive metal and electrically connecting electrodes of adjacent cells 10, detection terminals 40 for detecting a voltage, and covers (sheet materials) 50 covering an upper portion of the resin case 20.

The resin case 20, which is a member to be attached of the fixing structure for a sheet material according to the present embodiment, serves as a main body of the busbar module 200 and is integrally molded with the insulating resin. In the resin case 20, a plurality of busbar accommodating portions 21 each having a rectangular box shape are connected via tolerance absorbing portions 23 along an arrangement direction (front-rear direction) of the cells 10 and are provided in parallel in two rows.

The positive electrode 11 and the negative electrode 13 of the adjacent cells 10 are arranged below the plurality of busbar accommodating portions 21 provided in parallel in two rows. A plurality of terminal openings 25 corresponding to the positive electrode 11 and the negative electrode 13 of each cell 10 are formed in a bottom wall of each busbar accommodating portion 21. A busbar 30 made of a conductive metal plate for connecting the positive electrode 11 to the negative electrode 13 exposed from the terminal opening 25 is accommodated in each busbar accommodating portion 21.

The busbar 30 accommodated in each busbar accommodating portion 21 is formed of a conductive metal material such as copper or a copper alloy into a plate shape. The busbar 30 is welded to the positive electrode 11 and the negative electrode 13, thereby electrically connecting the positive electrode 11 to the negative electrode 13. The plurality of busbars 30 are connected to the positive electrode 11 and the negative electrode 13 of the adjacent cells 10 of the assembled battery 100 to connect the cells 10 in series.

A busbar 33 connected to the negative electrode 13 in the cell 10 disposed on a front end side (a left end side in FIG. 2) of the assembled battery 100 is a total negative electrode terminal, and a busbar 31 connected to the positive electrode 11 in the cell 10 disposed on a rear end side (a right end side in FIG. 2) of the assembled battery 100 is a total positive electrode terminal.

Here, a configuration of the assembled battery 100 is not limited to a configuration in which the plurality of cells 10 are connected in series, and various configurations may be adopted.

For example, a plurality of cells 10 adjacent to each other may be arranged in parallel such that the poles of the electrodes are aligned, and the plurality of cells 10 in which the poles of the electrodes are aligned in parallel may constitute one battery set. The battery set of the cells 10 adjacent to each other is disposed such that the poles of the electrodes are alternately arranged to constitute the assembled battery.

Further, the detection terminal 40 electrically connected to one end of an electric wire 41 is welded on the busbar 31 (31, 33). The electric wires 41 whose one ends are connected to the detection terminals 40 are led out from slit openings of the busbar accommodating portions 21, respectively, and are routed in a central groove 27 that is defined between the plurality of busbar accommodating portions 21 provided in parallel in two rows and extends along the arrangement direction of the cells 10 (see FIG. 1).

An upper face of each busbar accommodating portion 21 opposite to the cell 10 is opened as a rectangular opening portion. Rectangular opening portions of the plurality of busbar accommodating portions 21 are covered with the cover 50 for each row provided in parallel.

Figure 3:
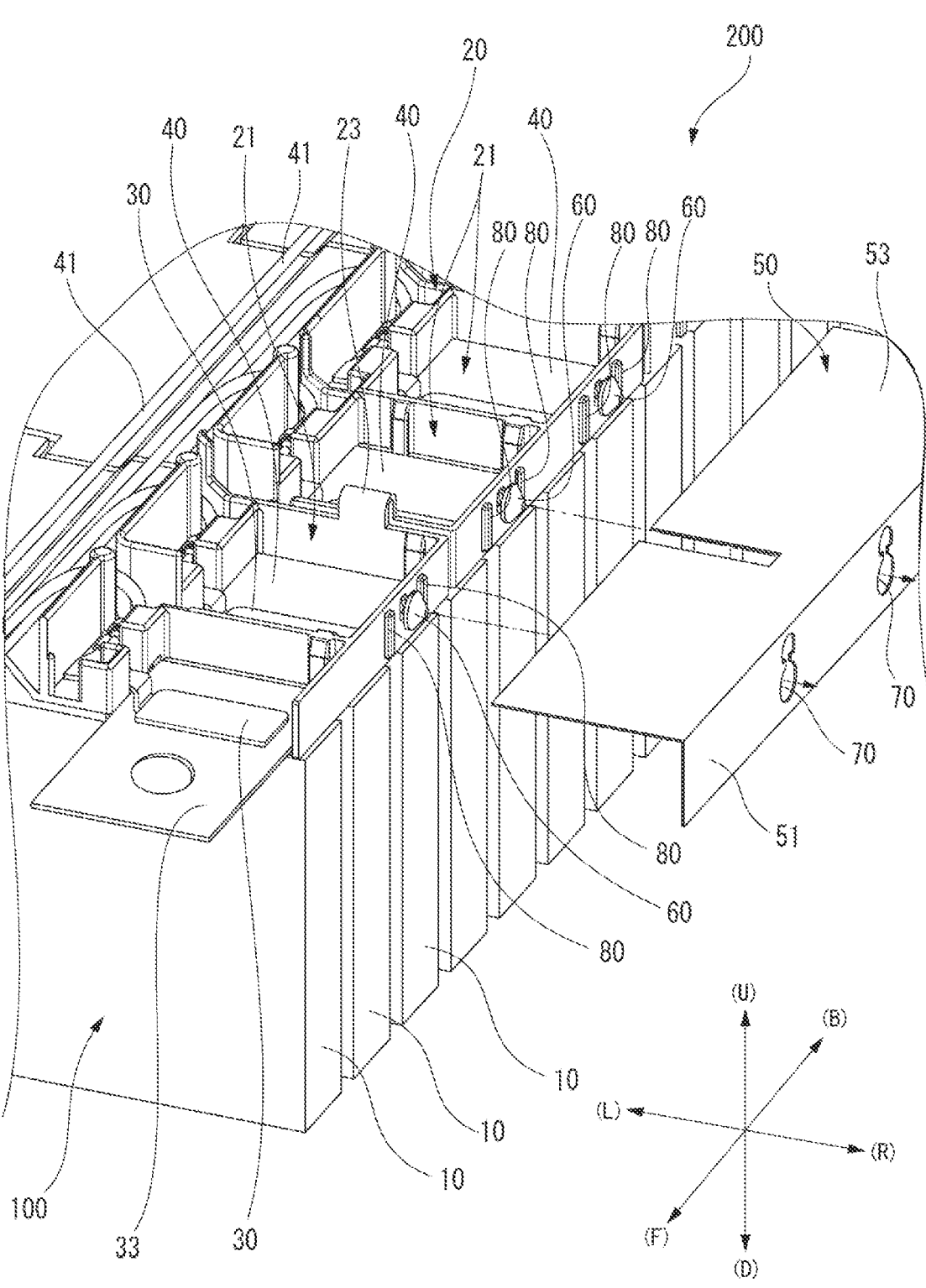
FIG. 3 is a partially enlarged view showing a state before a sheet material shown in FIG. 1 is attached to a resin case.
Figure 4:
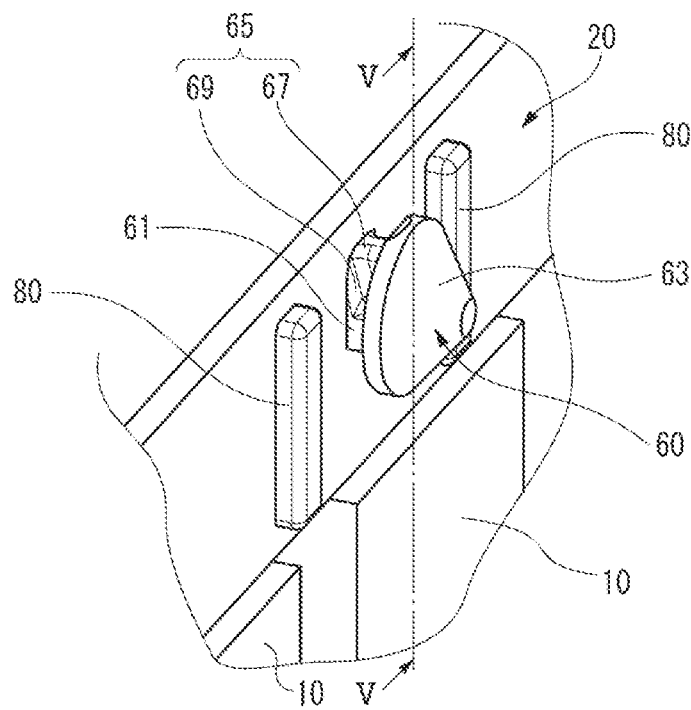
FIG. 4 is an enlarged perspective view of a locking portion shown in FIG. 3.
Figure 5:
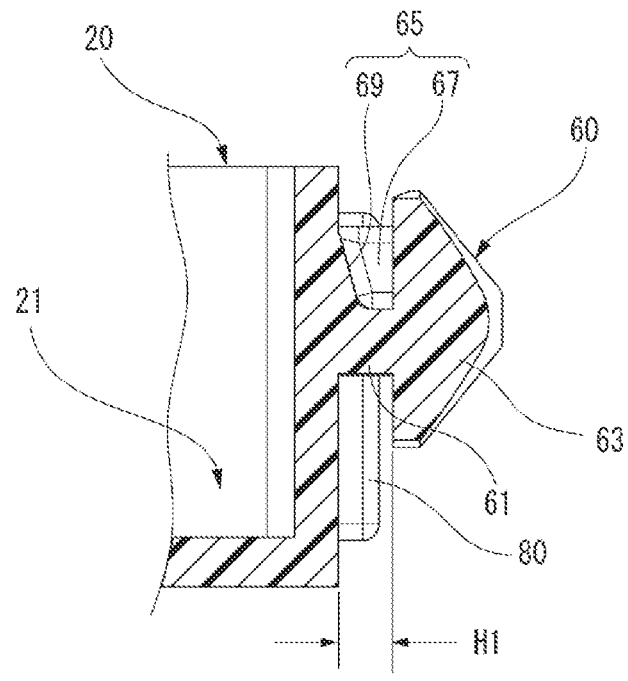
FIG. 5 is a cross-sectional view taken along a line V-V in FIG. 4.
Figure 6:
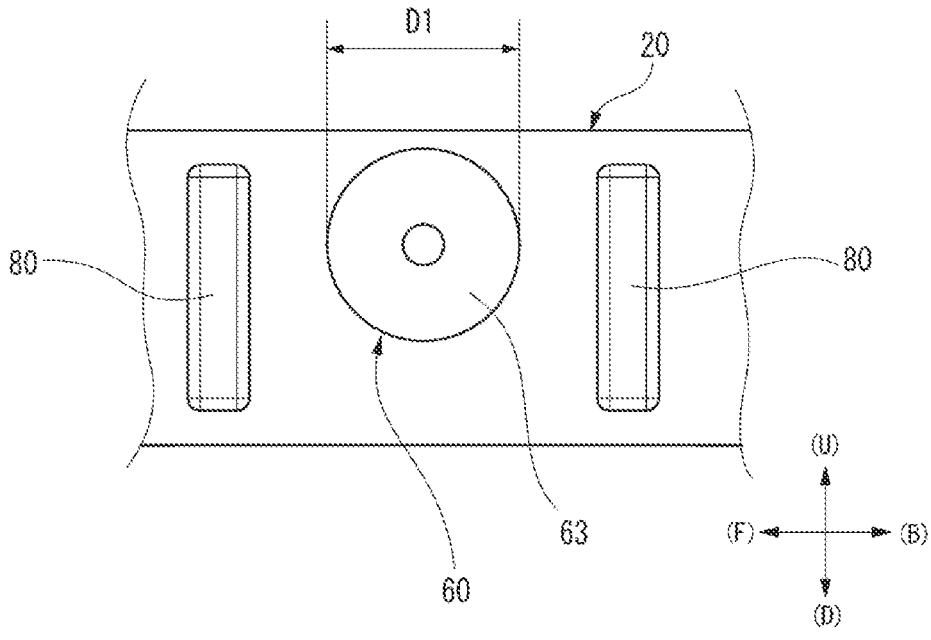
FIG. 6 is an enlarged front view of the locking portion shown in FIG. 3.
Figure 7:
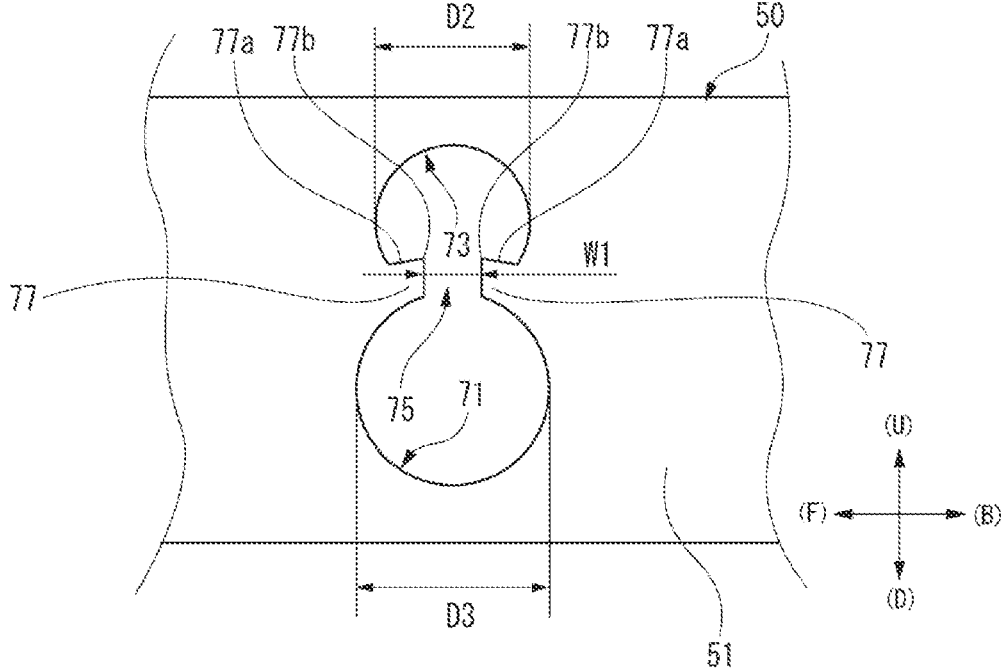
FIG. 7 is a front view of a main portion of an attaching and fixing portion of the sheet material shown in FIG. 3.

FIG. 3 is a partially enlarged view showing a state before the cover 50 shown in FIG. 1 is attached to the resin case 20. FIG. 4 is an enlarged perspective view of a locking portion 60 shown in FIG. 3, and FIG. 5 is a cross-sectional view taken along a line V-V in FIG. 4. FIG. 6 is an enlarged front view of the locking portion 60 shown in FIG. 3. FIG. 7 is a front view of a main portion of an attaching and fixing portion 51 of the cover 50 shown in FIG. 3.

As shown in FIGS. 2 and 3, the cover 50, which is a sheet material of the fixing structure for a sheet material according to the present embodiment, is an elongated member having an L-shaped cross section and including the attaching and fixing portion 51 in which a plurality of attachment hole portions 70 to be attached to a plurality of locking portions 60 provided in the resin case 20 are formed, and a lid body portion 53 that is vertically connected to a longitudinal side edge of the attaching and fixing portion 51 and covers the busbar accommodating portion 21 of the resin case 20. The cover 50 is formed of a sheet material made of an insulating resin such as polyethylene terephthalate (PET).

As shown in FIGS. 3 and 7, the attachment hole portion 70 is a so-called potbelly hole (keyhole) having an opening shape in which a large-diameter hole 71 and a small-diameter hole 73 communicate with each other through a communication portion 75.

The communication portion 75 of the attachment hole portion 70 is provided with a pair of projecting pieces 77 in which a width W1 of the communication portion 75 is narrower than an inner diameter D2 of the small-diameter hole 73. Further, a side edge 77a of the projecting piece 77 on a small-diameter hole 73 side is formed with a return-shaped portion 77b having a tip end protruding toward the small-diameter hole 73 side.

As shown in FIGS. 3 to 6, the plurality of locking portions 60 of the fixing structure for a sheet material according to the present embodiment are provided on an outer side face of the resin case 20 along a longitudinal direction (front-rear direction) so as to correspond to the attachment hole portions 70 of the cover 50. The cover 50 is detachably attached to the resin case 20 by locking the attachment hole portion 70 to the locking portion 60.

The locking portion 60 includes a column portion 61 vertically provided on the outer side face of the resin case 20 along the longitudinal direction, a head portion 63 formed at a tip end portion of the column portion 61 inserted into the small-diameter hole 73, and an insertion guide portion 65 formed on a side face of the column portion 61.

Figure 9:
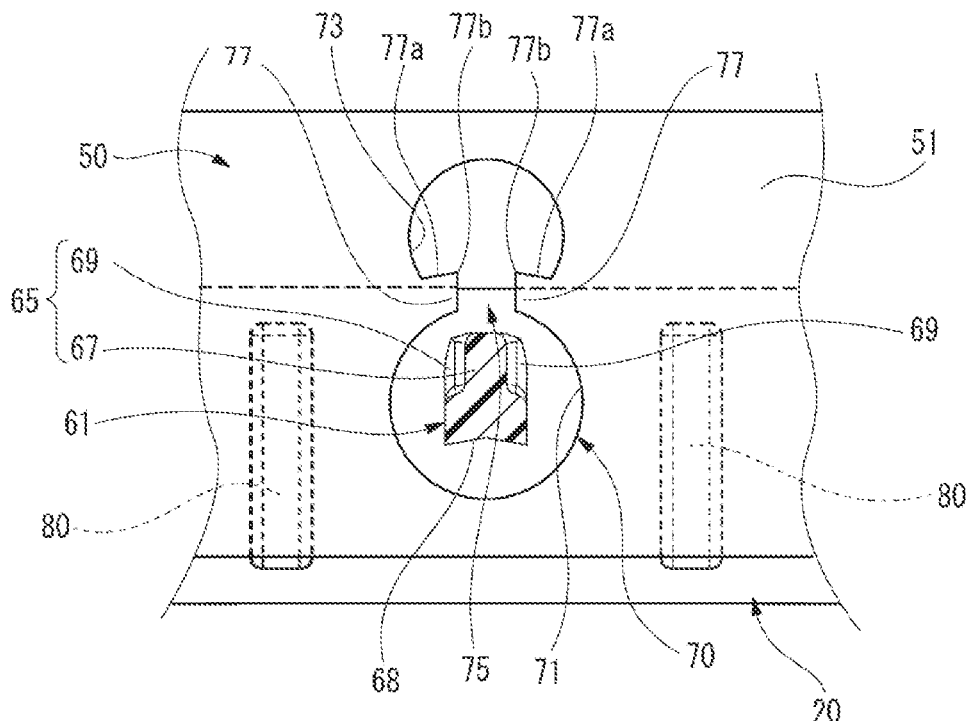
FIG. 9 is a cross-sectional view taken along a line IX-IX in FIG. 8.

A locking concave portion 68 corresponding to the return-shaped portion 77b of the cover 50 is formed on a side face of the column portion 61 opposite to the side face on which the insertion guide portion 65 is provided (see FIG. 9).

The head portion 63 formed at the tip end portion of the column portion 61 has a substantially conical shape having a diameter D1 larger than the inner diameter D2 of the small-diameter hole 73 and smaller than an inner diameter D3 of the large-diameter hole 71, and is inserted into the large-diameter hole 71 and locked to an opening edge of the small-diameter hole 73.

The insertion guide portion 65 has a narrow width portion 67 narrower than the width W1 of the communication portion 75, and a pair of inclined faces 69 formed on both sides of the narrow width portion 67 in a width direction for bending, in a thickness direction of the attaching and fixing portion 51, the projecting pieces 77 that are brought into contact with the column portion 61 when the column portion 61 is passed through the communication portion 75 (see FIG. 9).

Further, a pair of support convex portions 80 disposed in the longitudinal direction (front-rear direction) with the locking portion 60 interposed therebetween are provided on the outer side face of the resin case 20 along the longitudinal direction so as to protrude in the vicinity of the locking portion 60.

Figure 15:
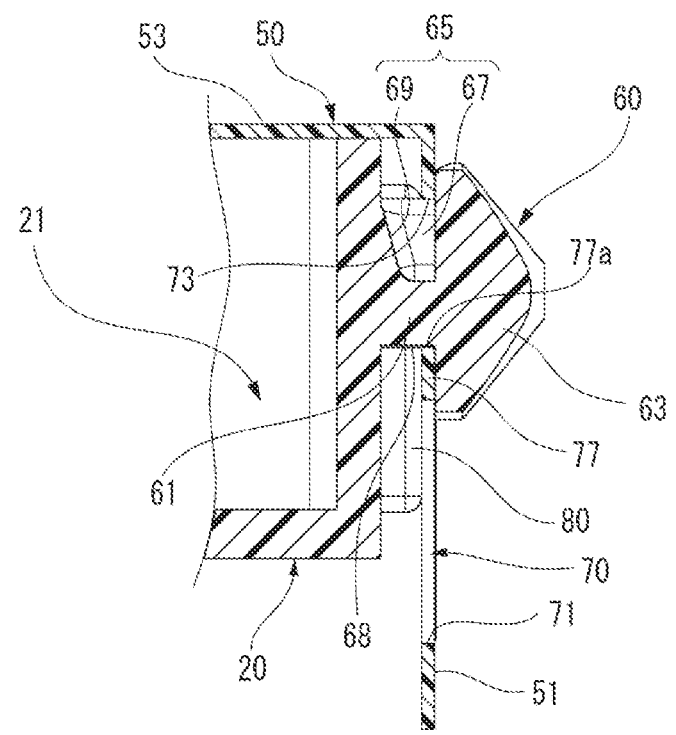
FIG. 15 is a cross-sectional view taken along a line XV-XV in FIG. 14.

As shown in FIGS. 4 and 5, the support convex portions 80 are rectangular rib protrusions extending in the up-down direction (the arrow (U)-(D) direction) of the resin case 20, and are, for example, set to a height that is lower than a height H1 of the column portion 61 of the locking portion 60 by the thickness of the cover 50 (see FIG. 15). It is needless to say that the support convex portion 80 is not limited to the rectangular rib protrusion, and may adopt various shapes such as a cylindrical boss protrusion.

Next, an attachment procedure for attaching the cover 50 to the resin case 20 will be described with reference to FIGS. 8 to 15.

Figure 8:
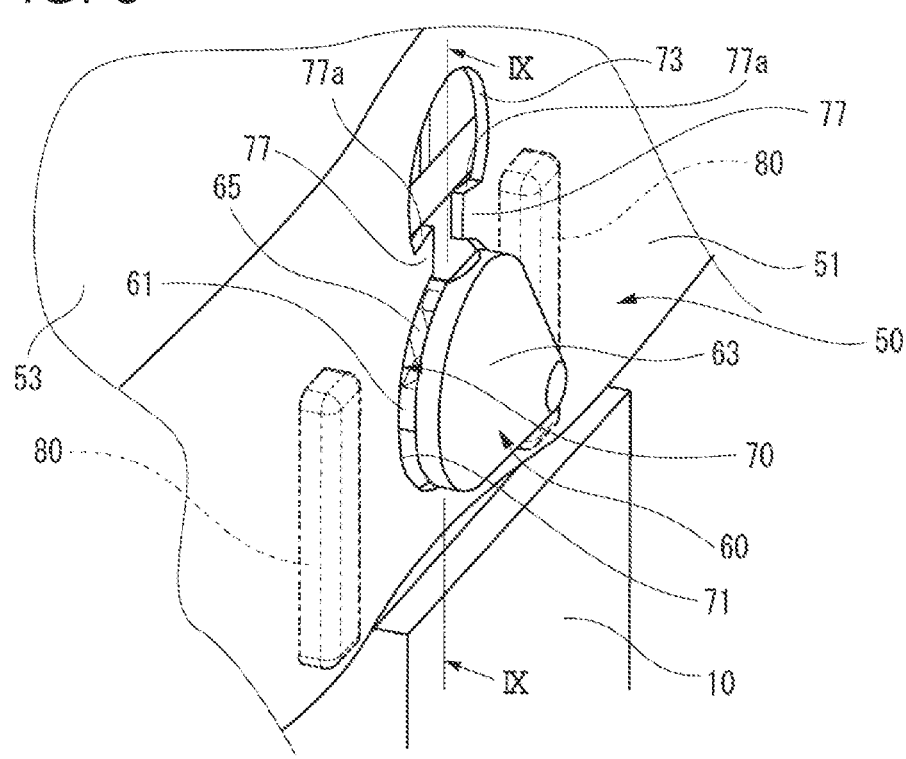
FIG. 8 is an enlarged perspective view showing a state in which a column portion of the locking portion shown in FIG. 4 is inserted into a large-diameter hole of an attachment hole portion provided in an attaching and fixing portion.

FIG. 8 is an enlarged perspective view showing a state in which the column portion 61 of the locking portion 60 shown in FIG. 4 is inserted into the large-diameter hole 71 of the attachment hole portion 70 of the attaching and fixing portion 51, and FIG. 9 is a cross-sectional view taken along a line IX-IX in FIG. 8.

First, as shown in FIG. 3, the attaching and fixing portion 51 of the cover 50 is brought close to the outer side face of the resin case 20 along the longitudinal direction along the left-right direction (the arrow (L)-(R) direction) of the resin case 20, and the head portions 63 of the plurality of locking portions 60 are inserted into the large-diameter holes 71 of the corresponding attachment hole portions 70. At this time, since the head portion 63 has a substantially conical shape, the locking portion 60 can be smoothly inserted into the large-diameter hole 71.

Next, the attaching and fixing portion 51 in the vicinity of the attachment hole portion 70 is pressed toward a resin case 20 side. As a result, as shown in FIGS. 8 and 9, the attaching and fixing portion 51 supported by the pair of support convex portions 80 disposed with the locking portion 60 interposed therebetween is bent toward the resin case 20 side, and an inner face of the attaching and fixing portion 51 comes into contact with the outer side face of the resin case 20.

Figure 10:
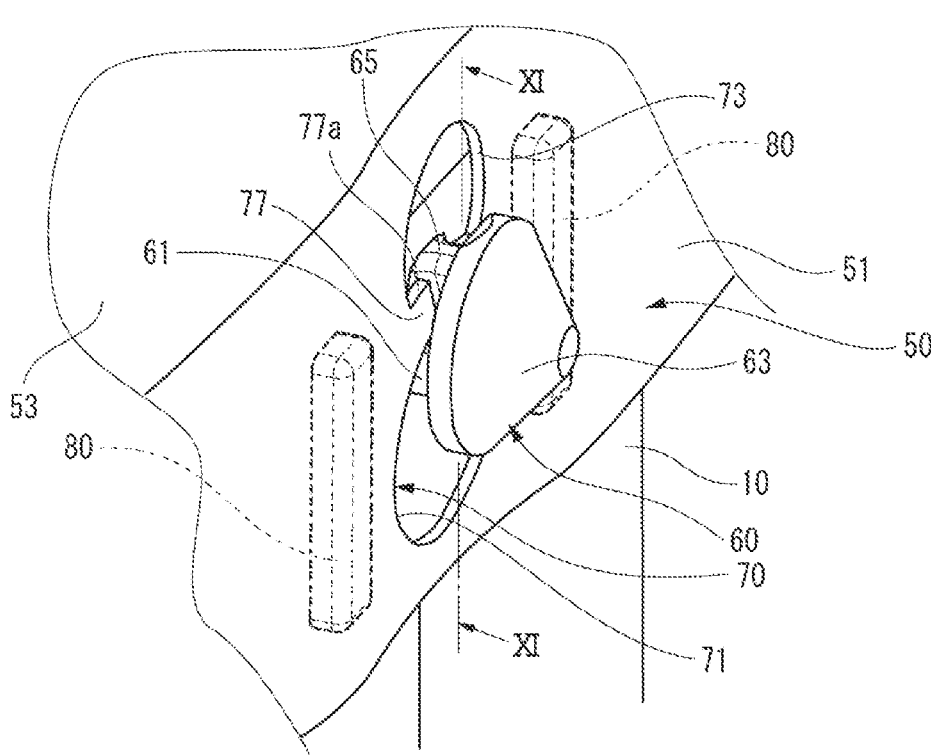
FIG. 10 is an enlarged perspective view showing a state in which a communication portion of an attachment hole portion has passed through the column portion of the locking portion shown in FIG. 8.
Figure 11:
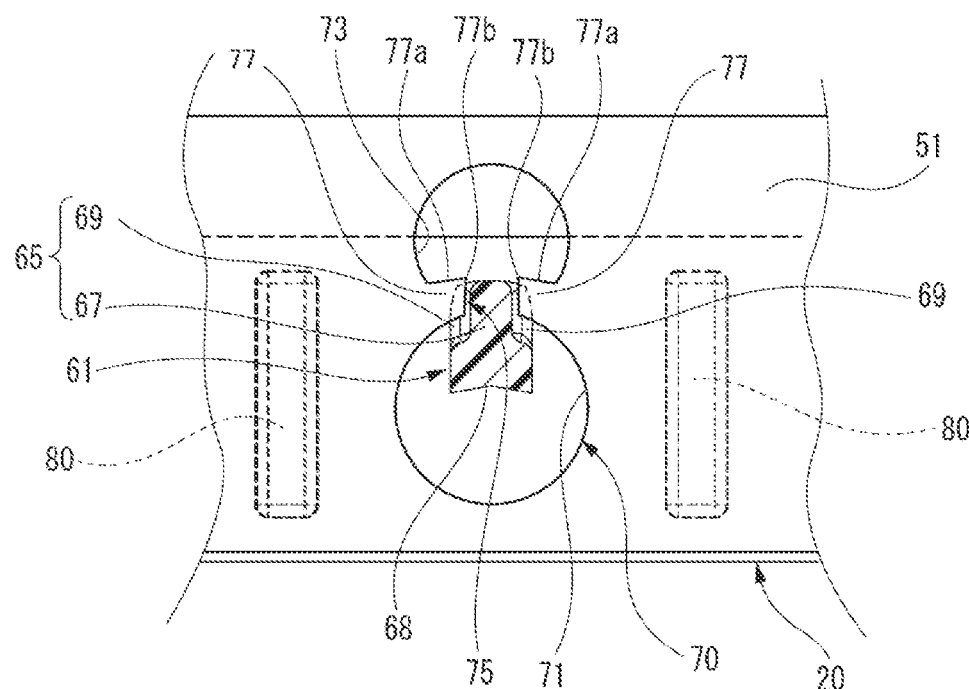
FIG. 11 is a cross-sectional view taken along a line XI-XI in FIG. 10.

FIG. 10 is an enlarged perspective view showing a state in which the communication portion 75 of the attachment hole portion 70 has passed through the column portion 61 of the locking portion 60 shown in FIG. 8, and FIG. 11 is a cross-sectional view taken along a line XI-XI in FIG. 10.

Then, as shown in FIGS. 10 and 11, the cover 50 is moved downward while the inner face of the attaching and fixing portion 51 is in sliding contact with the outer side face of the resin case 20 (of course, the inner face of the attaching and fixing portion 51 bent toward the resin case 20 side may not be in contact with the outer side face of the resin case 20), and the communication portion 75 of the attachment hole portion 70 is passed through the column portion 61 of the locking portion 60.

The insertion guide portion 65 having the narrow width portion 67 narrower than the width W1 of the communication portion 75 and the pair of inclined faces 69 formed on both sides of the narrow width portion 67 in the width direction is provided on the side face of the column portion 61 facing the pair of projecting pieces 77 in the communication portion 75 of the attachment hole portion 70.

Here, in the column portion 61 of the locking portion 60 passing through the communication portion 75 of the attachment hole portion 70, first, the narrow width portion 67 enters a space between the pair of projecting pieces 77. At this time, the narrow width portion 67 narrower than the width W1 of the communication portion 75 can easily guide the communication portion 75 of the attachment hole portion 70.

When the cover 50 further moves downward, the pair of inclined faces 69 come into contact with the pair of projecting pieces 77, respectively, and the projecting pieces 77 are bent in the thickness direction of the attaching and fixing portion 51 (a right direction in FIG. 10). When the cover 50 further moves downward, the pair of projecting pieces 77 pass through the column portions 61 of the locking portions 60 while being bent in the thickness direction of the attaching and fixing portion 51. At this time, the communication portion 75 can smoothly pass through the column portion 61 of the locking portion 60 in a state where the pair of projecting pieces 77 are bent and the width W1 is widened.

Figure 12:
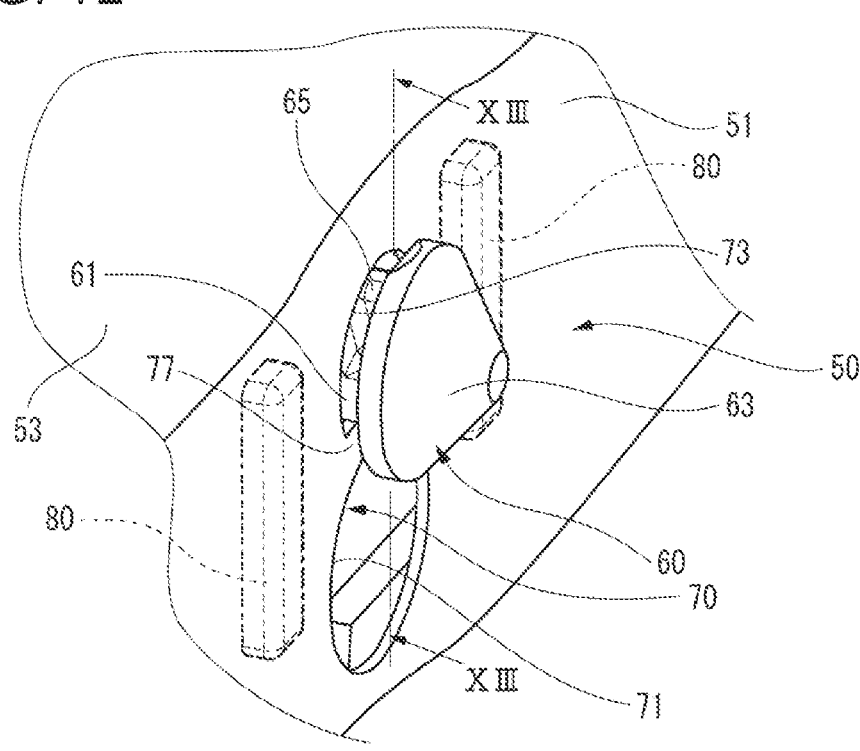
FIG. 12 is an enlarged perspective view showing a state in which the column portion of the locking portion shown in FIG. 10 is inserted into a small-diameter hole of the attachment hole portion.
Figure 13:
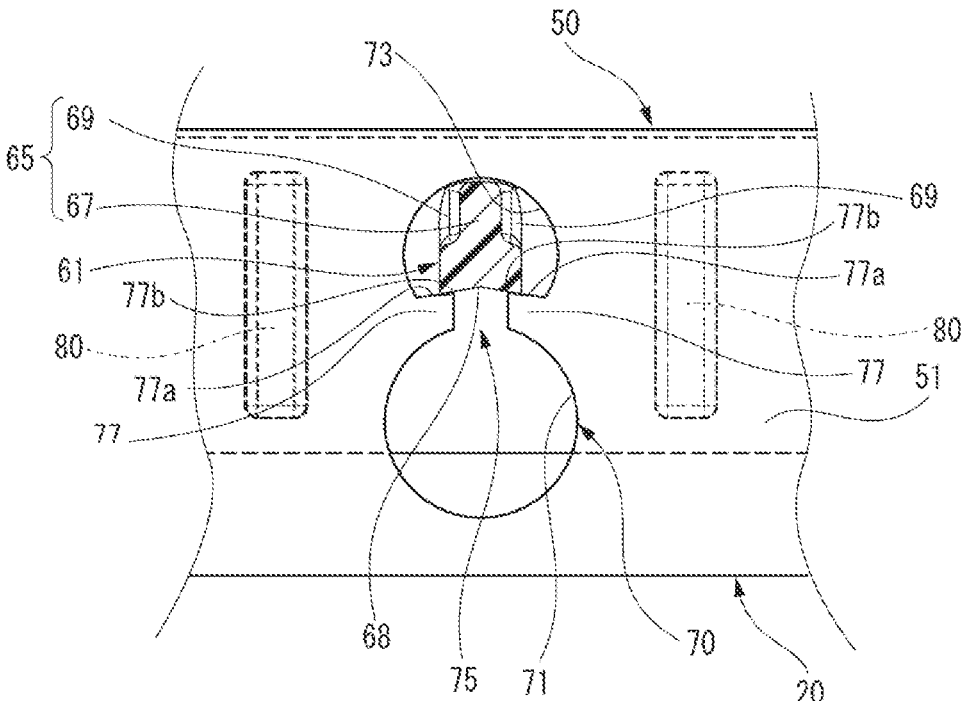
FIG. 13 is a cross-sectional view taken along a line XIII-XIII in FIG. 12.

FIG. 12 is an enlarged perspective view showing a state in which the column portion 61 of the locking portion 60 shown in FIG. 10 is inserted into the small-diameter hole 73 of the attachment hole portion 70, and FIG. 13 is a cross-sectional view taken along a line XIII-XIII in FIG. 12.

Then, when the cover 50 is further moved downward, as shown in FIGS. 12 and 13, the locking portion 60 is moved to the small-diameter hole 73 of the corresponding attachment hole portion 70, and the pair of projecting pieces 77 that have been bent and deformed return to the original state. At this time, the return-shaped portion 77b of the projecting piece 77 is locked to the locking concave portion 68 of the locking portion 60, and the column portion 61 of the locking portion 60 is prevented from passing through the communication portion 75 inadvertently and moving to the large-diameter hole 71.

Figure 14:
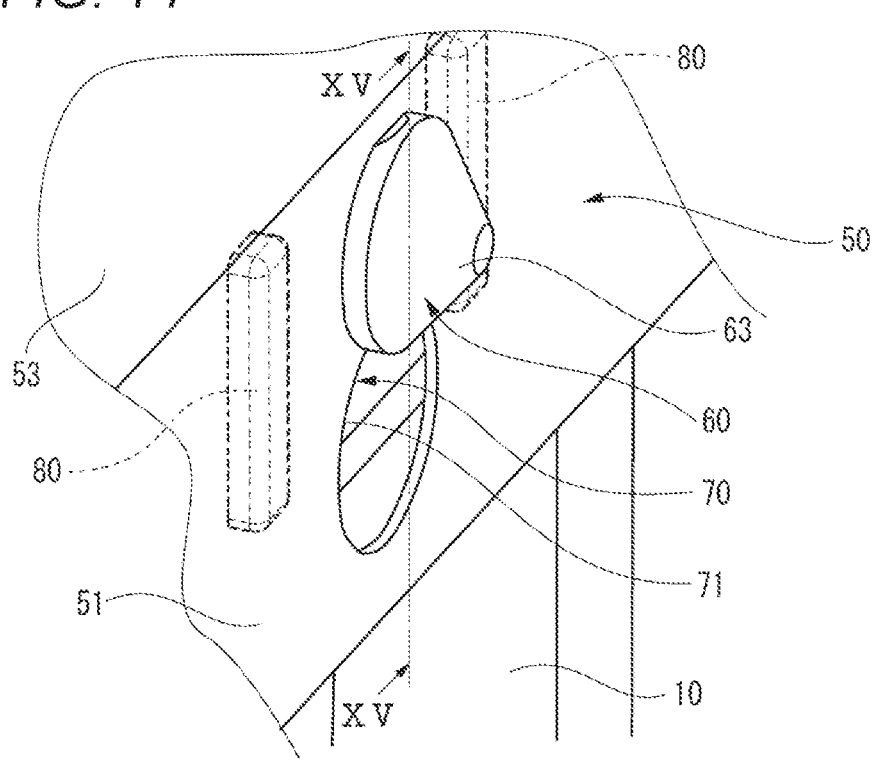
FIG. 14 is an enlarged perspective view showing a state in which an opening edge of the small-diameter hole is in contact with a head portion of the locking portion shown in FIG. 12 and the sheet material is attached.

FIG. 14 is an enlarged perspective view showing a state in which the opening edge of the small-diameter hole 73 is in contact with the head portion 63 of the locking portion 60 shown in FIG. 12 and the cover 50 is attached, and FIG. 15 is a cross-sectional view taken along a line XV-XV in FIG. 14.

When a pressing force pressing the attaching and fixing portion 51 of the cover 50 toward the resin case 20 side is released, the attaching and fixing portion 51 that has been bent toward the resin case 20 side returns to the original state as shown in FIGS. 14 and 15. At this time, in the attaching and fixing portion 51 of the cover 50 supported by the pair of support convex portions 80 disposed with the locking portion 60 interposed therebetween, the vicinity of the opening edge of the small-diameter hole 73 is reliably in contact with a lower face of the head portion 63. Therefore, the cover 50 attached to the locking portion 60 of the resin case 20 is prevented from tilting or rattling with respect to the outer side face of the resin case 20.

Next, effects of the busbar module 200 using the fixing structure for a sheet material according to the present embodiment will be described.

As described above, according to the busbar module 200 using the fixing structure for a sheet material according to the present embodiment, when the cover 50 is attached to the resin case 20, the insertion guide portion 65 having the inclined face 69 formed on the side face of the column portion 61 of the locking portion 60 bends the projecting piece 77 of the attachment hole portion 70 in the thickness direction of the attaching and fixing portion 51.

Thus, the projecting piece 77 passes through the column portion 61 of the locking portion 60 while being bent in the thickness direction of the attaching and fixing portion 51. The communication portion 75 of the attachment hole portion 70 can smoothly pass through the column portion 61 of the locking portion 60 in a state in which the projecting piece 77 is bent and the width W1 is widened.

Therefore, when the cover 50 is attached to the resin case 20, there is no possibility that the projecting piece 77 of the communication portion 70 is plastically deformed or damaged, and the cover 50 can be reliably and easily attached to and detached from the resin case 20.

Further, according to the busbar module 200 using the fixing structure for a sheet material according to the present embodiment, in the side edge 77a of the projecting piece 77 on the small-diameter hole 73 side, the return-shaped portion 77b having the tip end protruding toward the small-diameter hole 73 side is formed, and the locking concave portion 68 corresponding to the return-shaped portion 77b is formed in the column portion 61.

Therefore, in the cover 50 attached to the resin case 20, the return-shaped portion 77b of the projecting piece 77 is locked to the locking concave portion 68 of the locking portion 60, and it is possible to reliably prevent the column portion 61 of the locking portion 60 from passing through the communication portion 75 inadvertently, moving to the large-diameter hole 71, and falling off.

Further, according to the busbar module 200 using the fixing structure for a sheet material according to the present embodiment, the pair of support convex portions 80 provided on the resin case 20 with the locking portion 60 interposed therebetween support the cover 50 such that the opening edge of the small-diameter hole 73 comes into contact with the head portion 63.

Therefore, the cover 50 attached to the locking portion 60 of the resin case 20 is prevented from tilting or rattling with respect to the outer side face of the resin case 20.

Therefore, according to the busbar module 200 using the fixing structure for a sheet material according to the present embodiment, the cover 50, which is a sheet material, can be reliably and detachably attached to the resin case 20 which is a member to be attached.

The present disclosure is not limited to the above-described embodiment, and can be appropriately modified, improved, or the like. In addition, materials, shapes, dimensions, numbers, disposition positions, and the like of the respective constituent elements in the embodiment described above are freely selected and are not limited as long as the present disclosure can be implemented.

In the above embodiment, the sheet material is described as an example of the cover 50 covering the busbar accommodating portion 21 of the resin case 20 in the busbar module 200, and the sheet material can be, for example, a cover that covers the central groove 27 of the resin case 20 or a sheet member that is appropriately attached to the resin case 20. Although the resin case 20 has been described as an example of the member to be attached, the present disclosure is not limited thereto, and the member to be attached may adopt various forms. Further, the sheet material is not limited to an insulating resin, and various materials such as a metal plate can be used.

Accordingly, the fixing structure for a sheet material according to the present embodiment can be applied when various sheet materials are attached to various members to be attached.

Here, features of the above-described embodiment of the attachment structure for a sheet material according to the present disclosure will be briefly summarized and listed in the following (i) to (v).

(i) An attachment structure for a sheet material includes:

an attachment hole portion (70) that is provided in a sheet material (a cover 50) and in which a large-diameter hole (71) and a small-diameter hole (73) communicate with each other through a communication portion (75);

a locking portion (60) provided in a member to be attached (a resin case 20) corresponding to the attachment hole portion (70), and configured to lock the attachment hole portion (70) to attach the sheet material (the cover 50) to the member to be attached (the resin case 20); and a projecting piece (77) that is provided in the communication portion (75) and in which a width (W1) of the communication portion (75) is narrower than an inner diameter (D2) of the small-diameter hole (73), in which the locking portion (60) includes:

a column portion (61) provided in the locking portion (60) and inserted into the small-diameter hole (73);

a head portion (63) formed at a tip end portion of the column portion (61), inserted into the large-diameter hole (71), and locked to an opening edge of the small-diameter hole (73); and an insertion guide portion (65) having an inclined face (69) formed on a side face of the column portion (61), and configured to bend the projecting piece (77) in contact with the column portion (61) in a thickness direction of the sheet material (the cover 50) when the column portion (61) is passed through the communication portion (75).

(ii) In the attachment structure for a sheet material according to the above (i), in a side edge (77*a*) of the projecting piece (77) on a small-diameter hole (73) side, a return-shaped portion (77*b*) having a tip end protruding toward the small-diameter hole (73) side is formed, and a locking concave portion (68) corresponding to the return-shaped portion (77*b*) is formed in the column portion (61).

(iii) The attachment structure for a sheet material according to the above (i) or (ii) further includes:

a pair of support convex portions (80) provided on the member to be attached (the resin case 20) with the locking portion (60) interposed therebetween, and supporting the sheet material (the cover 50) such that the opening edge of the small-diameter hole (73) comes into contact with the head portion (63).

(iv) In the attachment structure for a sheet material according to any one of the above (i) to (iii), the sheet material (the cover 50) is an insulating resin sheet having an attaching and fixing portion (51) in which the attachment hole portion (70) attached to the locking portion (60) that is provided in the resin case (20) as the member to be attached is formed.

(v) In the attachment structure for a sheet material according to the above (iv), the insulating resin sheet includes a lid body portion (53) that is connected to the attaching and fixing portion (51) and covers a busbar accommodating portion (21) of the resin case (20).

Although the disclosure has been described in detail with reference to specific embodiment, it is apparent to those skilled in the art that various changes and modifications can be made without departing from the spirit and scope of the disclosure.

What is claimed is:

1. An attachment structure for a member and a sheet material to be attached to the member, the attachment structure comprising:

an attachment hole portion that is provided in the sheet material, and includes a large-diameter hole, a small-diameter hole, and a communication portion, the large-diameter hole and the small-diameter hole communicate with each other through the communication portion;

a locking portion in the member corresponding to the attachment hole portion, the locking portion is configured to lock with the attachment hole portion to attach the sheet material to the member; and a projecting piece that is provided in the communication portion and in which a width of the communication portion is narrower than an inner diameter of the small-diameter hole, wherein the locking portion includes:

a column portion that is configured to be inserted into the small-diameter hole;

a head portion formed at a tip end portion of the column portion, the head portion is configured to be inserted into the large-diameter hole and locked into contact with an opening edge of the small-diameter hole; and an insertion guide portion having an inclined face formed on a side face of the column portion that is configured to bend the projecting piece in a thickness direction of the sheet material when the column portion comes into contact with the projecting piece and passes through the communication portion.

2. The attachment structure according to claim 1, wherein the projecting piece includes a side edge and a return-shaped portion, the side edge is on a small-diameter hole side, and the return-shaped portion is formed on the side edge and has a tip end protruding toward the small-diameter hole side, and wherein a locking concave portion corresponding to the return-shaped portion is formed in the column portion.

3. The attachment structure according to claim 1, further comprising:

a pair of support convex portions provided on the member with the locking portion interposed therebetween, and the pair of support convex projections supporting the sheet material when the opening edge of the small-diameter hole to come into contact with the head portion.

4. The attachment structure according to claim 1, wherein the sheet material is an insulating resin sheet having an attaching and fixing portion, and the attachment hole portion is located in the attaching and fixing portion, and wherein the member is a resin case, and the locking portion is provided in the resin case.

5. The attachment structure according to claim 4, wherein the resin case includes a busbar accommodating portion, and wherein the insulating resin sheet includes a lid body portion that is connected to the attaching and fixing portion and covers the busbar accommodating portion.

* * * * *